United States Patent [19]
Larkum

[11] Patent Number: 5,435,473
[45] Date of Patent: Jul. 25, 1995

[54] LOCKABLE FISHING ROD HOLDER

[76] Inventor: John A. Larkum, Rte. 1 Box 752, Kilmarnock, Va. 22482

[21] Appl. No.: 320,491

[22] Filed: Oct. 6, 1994

[51] Int. Cl.[6] ............................................. B60R 9/00
[52] U.S. Cl. ............................... 224/569; 224/922; 224/571; 211/70.8; 211/4; 70/58; 70/62
[58] Field of Search ............... 224/42.45 R, 42.42, 224/922; 211/70.8, 4; 70/58, 62, 61, 230; 43/21.2

[56] References Cited

U.S. PATENT DOCUMENTS

| | | | |
|---|---|---|---|
| 4,063,646 | 12/1977 | Stahl, Jr. | 211/4 |
| 4,572,416 | 2/1986 | Upham | 224/326 |
| 4,871,099 | 10/1989 | Bogar, Jr. | 224/42.45 R |
| 5,033,223 | 7/1991 | Minter | 43/21.2 |
| 5,205,446 | 4/1993 | Greenberg | 224/42.03 A |

Primary Examiner—Linda J. Sholl
Attorney, Agent, or Firm—Albert C. Pollard

[57] ABSTRACT

A fishing rod holder including vertical tubes into which the handles of fishing rods are inserted. A slot extending from the top of each vertical tube downward receives the post of a fishing reel. A single horizontal restraining bar passes through holes in the tubular holders above the reel post to prevent removal of the fishing rods. A means to prevent removal of the restraining bar includes a pad lock through a radial hole in the restraining bar.

4 Claims, 1 Drawing Sheet

LOCKABLE FISHING ROD HOLDER

BACKGROUND OF INVENTION

1. Field of Invention

The present invention is a vehicular mounted fishing rod holder with a mechanism to restrain fishing rods with a lock.

2. Prior Art

Fishing rod holders mounted to front bumpers of sport vehicles holding fishing rods in a vertical position are popular in the sport of fishing.

These rod holders hold the rods in a convenient and easily accessible position as well as enhance the decor of the vehicle to which they are added. Typically these holders are comprised of several tubes vertically mounted to the front bumper of a vehicle. The handle ends of the fishing rods are inserted into the tubes.

U.S. Pat. No. 4,871,099 entitled "Fishing Rod Holder" issued Oct. 3, 1989 to Earl M. Boger, Jr. is similar to the type under discussion although it is directed toward being mounted on a boat as opposed to a vehicle. This rod holder has slots to restrain a post of a fishing reel. Another patent, U.S. Pat. No. 5,205,446 entitled "Fishing Pole Holder/Carrier For Use With A Vehicle" issued Apr. 27, 1993 to Phillip J. Greenburg discloses the vertical tubes common to this type of fishing rod holder. U.S. Pat. No. 4,572,416 entitled "Enclosing-Type Fishing Pole Carrier" issued on Feb. 25, 1986 to Niel F. Upham discloses a different type of rod holder comprising an enclosed tube with a lockable cap on the tube to prevent theft of the rods. While this particular holder is not the type of the present invention, it does have a lockable cap to prevent theft of the rods. While this enclosed type of rod holder does have utilitarian value, it does not present the visual appeal presented in the holder of the present invention. This holder also has a multitude of individual caps that can be lost or misplaced when removing the rods for use.

While the above patents have merit, they fail to disclose a rod holder of the vertical tube type with a means of locking the rods in the vertical tubes.

SUMMARY OF INVENTION

This invention improves upon the vertical tube vehicle mount type fishing rod holder by adding a feature to lockably restrain the fishing rods to prevent theft. Vertically mounted tubes receive the handles of the fishing rods. Each tube has a vertical slot extending from the top of the tube downward. This slot receives the posts of fishing reels of the rods being held. Above the reel posts, a single restraining bar passes through holes in each of the tubes. The restraining bar prevents removal of the fishing rods. The restraining bar has a locking means to prevent its unauthorized removal. One locking means utilizes a padlock through a hole in the restraining bar.

The object of this invention is to provide an attractive vertical tube type rod holder with simple and inexpensive means to prevent theft of the rods. A further object is to provide the locking means with a minimum components. A still further object is to avoid individual locking components such a caps and the like on each tubular member. Further objects and advantages of the invention will become apparent from the following description of the preferred embodiment.

DESCRIPTION OF PREFERRED EMBODIMENT

Figure 1:
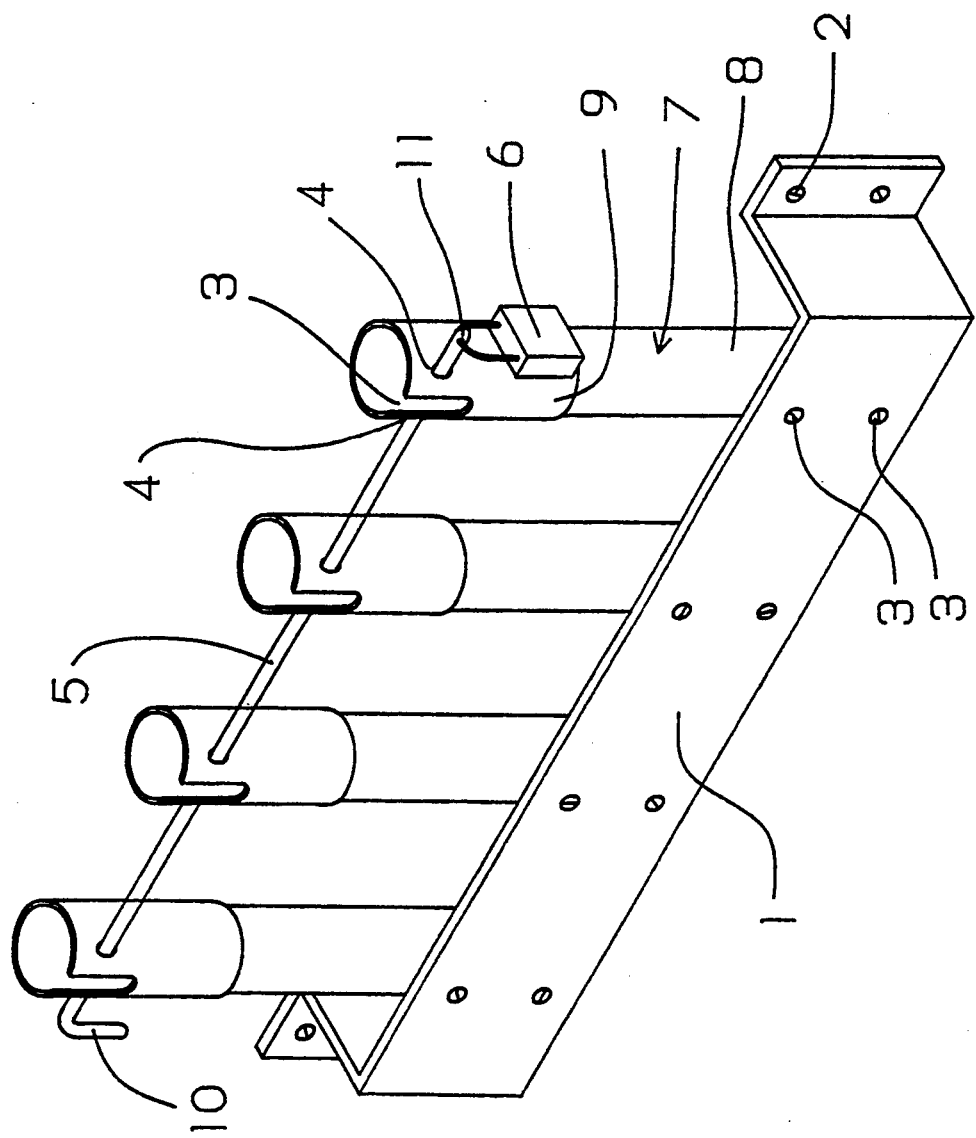
FIG. 1 is a prospective view of the lockable fishing rod holder.

Referring to FIG. 1, the fishing rod holder is mounted to a vehicle by means of fasteners 2 though horizontal support 1. This horizontal support 1 supports tubular rod holders 7. Tubular rod holders 7 are fastened to support 1 by means of fasteners 3. Fasteners 3 pass through support 1 into threaded holes in the tubular rod holders 7.

The tubular rod holder 7 is made from a section of 2 inch aluminum tubing 8 fitted with a PVC coupling 9. The purpose of using the PVC coupling is to facilitate machining of the top the tubular rod holder 7 as illustrated. The top of the tabular rod holder has a downward slot 3 cut parallel to the axis of the tubular rod holder 7. This slot is approximately ¾ of an inch wide and 3 inches long. Approximately 1½ inches from the top of the tubular rod holder 7, holes 4 are provided to receive restraining bar 5. These holes 4 are drilled horizontally through the tubular rod holder 7 near slot 3. The holes 4 in each tubular rod holder 7 are also in alignment so that restraining bar 5 can pass through all of the holes 4 of all the tubular rod holders 7.

Restraining bar 7 has a bent portion 10 to prevent the bar 7 from passing completely through the holes 4. On the opposite end of restraining bar 5, a padlock hole 11 is provided to receive padlock 6. The extreme end of restraining bar 5 is slightly tapered to facilitate passing the restraining bar 5 through the holes 4.

MODE OF OPERATION OF INVENTION

To use the invention, restraining bar 5 is first removed. Handles of fishing rods (not shown) are placed in the tubular rod holders 7 with the stems of the fishing reels (not shown) extending through slot 3.

To lock the rods in place and prevent theft, restraining rod 5 is inserted through holes 4 of all of the tubular rod holders and a padlock 6 is installed through padlock hole 11.

CONCLUSIONS, RAMIFICATIONS, SCOPE

As the reader can see, the inventor has devised an effective way to lock fishing rods in a holder to prevent theft. The method devised is simple effective and uses the minimum of parts. When not needed to prevent theft the locking mechanism does not have to be in place to prevent rods from slipping out of their holders. Although the preferred embodiment has been illustrated, the scope of the invention should be determined from the claims and their legal equivalents. For example, for the lock 11 to be effective, it is not necessary for it to be installed at the end of the restraining bar 5 because there are other locations along restraining bar 5 at which the lock would be effective in preventing removal of the restraining bar 5. Also for example, the claims do not restrict where on a vehicle this rod holder could be mounted.

What is claimed is:

1. A fishing rod holder comprising,
   a horizontally oriented support adapted to be mounted to a vehicle,
   a plurality of vertically extending tubular rod holders connected to and supported from said horizontal support, a slot in each said tubular rod holder for receiving and holding a reel post, said slot being open to the top of said tubular rod holder and extending downward, a pair of horizontal axially aligned holes through each said rod holder located above a lower extremity of said slot, said holes in each rod holder positioned in axial alignment with said holes of each other of said plurality of tubular rod holders, a horizontal restraining bar disposed through said holes, a means to deter unauthorized removal of said restraining bar.

2. The fishing rod holder of claim 1 wherein said restraining bar is of a cylindrical shape.

3. The fishing rod holder of claim 2 wherein said means to deter unauthorized removal is comprised of said restraining bar having, a first end deformed beyond the limits defined by said cylindrical shape, and a second end with a radial hole to receive a padlock.

4. The fishing rod holder of claim 3 wherein said first end is deformed into a right angle bend.

* * * * *